United States Patent [19]

Macken

[11] Patent Number: 5,155,323
[45] Date of Patent: Oct. 13, 1992

[54] DUAL FOCUS LASER WELDING

[76] Inventor: John Macken, 3755 Wallace Rd., Santa Rosa, Calif. 95404

[21] Appl. No.: 701,194

[22] Filed: May 16, 1991

[51] Int. Cl.⁵ .................................. B23K 26/00
[52] U.S. Cl. ........................ 219/121.64; 219/121.63; 219/121.77
[58] Field of Search .......... 219/121.76, 121.77, 219/121.84, 121.63, 121.64

[56] References Cited

U.S. PATENT DOCUMENTS 4,691,093  9/1987  Banas et al. .................. 219/121.63
4,945,202  7/1990  Budenbender ................. 219/121.63

Primary Examiner—C. L. Albritton
Attorney, Agent, or Firm—Larry D. Johnson

[57] ABSTRACT

A process for laser welding is described where two adjacent focal spots are used in the welding of metals or plastics. The position of these two focal spots are predetermined as to separation and orientation relative to the direction of travel. In the case of making a butt joint between two pieces of metal, one of the two focal spots strikes each of the individual pieces of metal, thereby straddling the butt seam to be welded.

3 Claims, 1 Drawing Sheet

DUAL FOCUS LASER WELDING

BACKGROUND OF THE INVENTION

The background of the invention will be discussed in two parts:

1. Field of the Invention

This invention relates to the welding of metals and plastics with a laser.

2. Description of Prior Art

The welding of metals with a laser is accomplished by focusing a high power laser beam on or near the metal. The usual power density achieved at the focus is in the range of 1,000,000 watts per square centimeter. This high power density is capable of forming a hole in the metal usually referred to as a "key hole." The key hole is surrounded by molten metal. After the key hole is formed, the focus laser spot is slowly translated relative to the metal. This causes the key hole to move. Molten metal flows around both sides of the key hole and comes together at the trailing edge of the key hole. The heat capacity in the remainder of the metal which was not raised to the liquid state rapidly cools the molten metal solidifying the weld as the key hole is translated through the metal.

The objective in welding is to attach two pieces of metal with the weld. One type of weld is referred to as a "butt joint." In this type of weld, two pieces of metal are joined together edge to edge. In making a butt joint, the prior art laser welding technique has the focused laser beam striking the seam between two pieces of metal. The other common laser weld is for the two pieces of metal to be over lapped so that the laser beam must penetrate through one layer of metal in order to reach the second piece of metal. Often, the key hole passes through both pieces of metal. This type of weld is commonly referred to as a "lap joint." For laser welding, achieving a good lap joint is easier and more reliable than a good butt joint. One reason for this is because the sheets of metal can be easily deformed in the thickness dimension to minimize the size of the gap in a lap weld. However, the metal is much stiffer in the plane of the metal sheet; therefore, butt welds have more problems with gaps. In a butt weld, the laser beam is striking the exact location where the two pieces of metal form the seam. Under ideal conditions, these two pieces of metal are contacting everywhere along the seam. In practice, tolerances and fixturing can cause gaps to appear in the seam. The deposition of heat into the two pieces of metal relies on the absorption of the laser beam by the metal. Gaps in the seam can affect the amount of laser power which is converted to heat in the metal. Also, gaps can affect the ability of molten metal to flow together in the wake of the key hole passage. Imperfect closure behind the key hole will cause a poor weld.

The present invention describes a process whereby the absorption of laser power in the vicinity of the seam of a butt joint is controlled more reliably even when there are slight gaps in the seam. Also, the process provides a more positive closure of the seam by the molten metal thereby forming a more reliable weld relative to prior art. Also, lap joints can be made at an improved speed under certain conditions compared to prior art.

SUMMARY OF THE INVENTION

A process for laser welding is described where two adjacent focal spots are used in the welding of metals or plastics. The position of these two focal spots are predetermined as to separation and orientation relative to the direction of travel. In the case of making a butt joint between two pieces of metal, one of the two focal spots strikes each of the individual pieces of metal, thereby straddling the butt seam to be welded.

DESCRIPTION OF THE PREFERRED EMBODIMENTS

Figure 1:
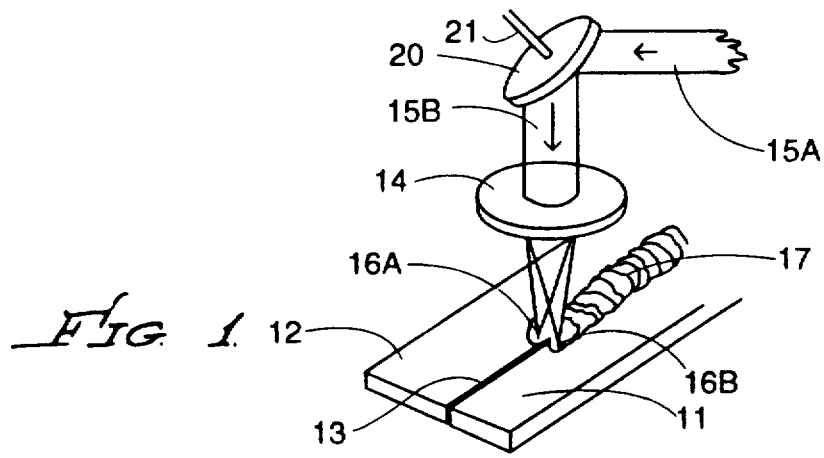
FIG. 1 is a prospective view of dual focus laser welding making a butt joint.

FIG. 1 shows a prospective view of two pieces of metal designated 11 and 12 being welded by the dual focus welding process described herein. In FIG. 1, a laser beam designated 15A interacts with a special optical element 20 to be discussed later. After this interaction, lase beam 15B emerges. Laser beam 15B is now two close proximity beams (perhaps overlapping) which propagate at a predetermined small angular difference. Beam 15B then passes through a lens designated 14. (A focusing mirror could substitute for lens 14.) The laser beam 15B forms two foci designated 16A and 16B at or near the surface of the metal. These two foci straddle either side of the seam designated 13 to be welded. The translation direction of the laser beam relative to the metal is parallel to seam 13. (Seam 13 can also be referred to as a "region of close proximity.") The positioning of the dual focus 16A and 16B will be described later. In the wake of the passage of the dual focus laser beam, a weld area designated 17 remains. Optical element 20 and axis 21 are related to possible means for creating the dual focus from a single laser beam. These components will be discussed later.

Figure 2:
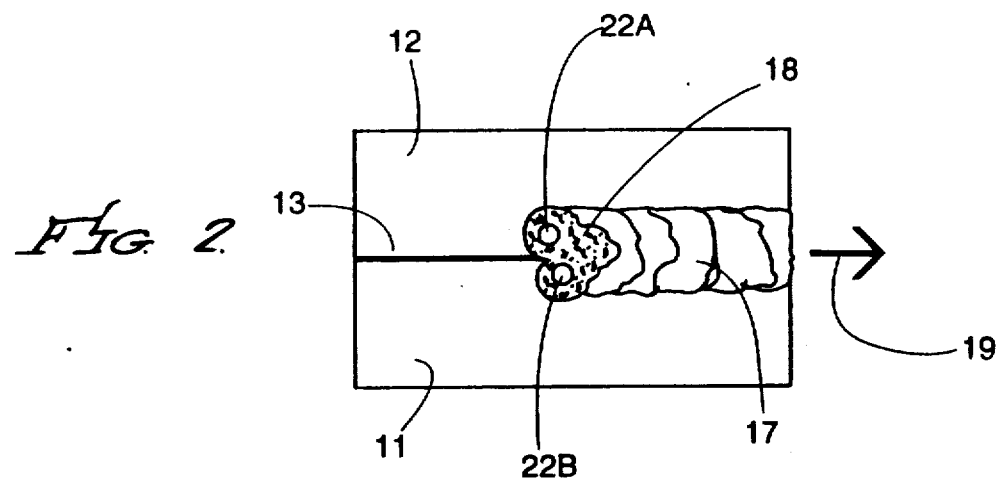
FIG. 2 is a top view of two pieces of metal being welded using the dual focus beams.

FIG. 2 is a top view of the metal being welded as described in FIG. 1. Metal pieces 11 and 12 are shown as well as seam 13 prior to welding. 22A and 22B are the two key holes formed in the metal pieces by foci 16A and 16B shown in FIG. 1. FIG. 2 can be thought of as the metal moving and the dual focus forming key holes 16A and 16B as being stationery. In this case, the direction of travel of the metal is defined as parallel to the arrow 19.

The shaded area designated 18 is the molten metal which is in the vicinity of the dual focus. Molten metal forms ahead of the two key holes. Some of this molten metal flows between the two key holes. Molten metal, melted by each of the two key holes, merges together in the region 18. As these two key holes proceed, the metal in the wake solidifies forming the welded area designated 17.

Figure 3:
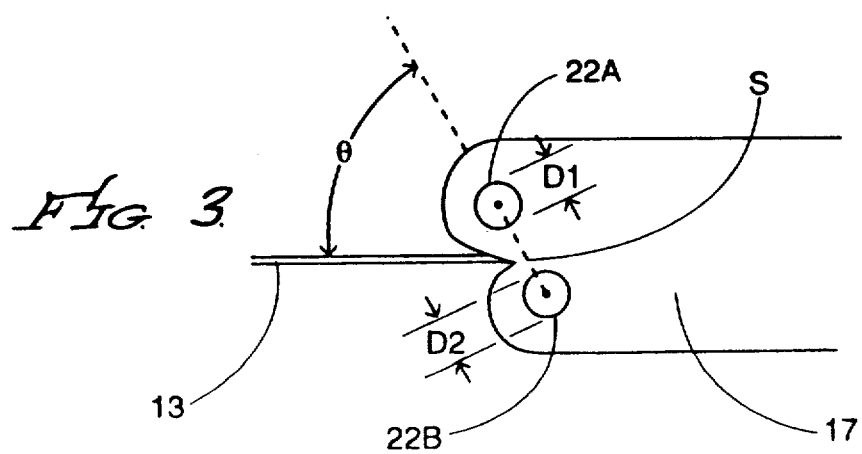
FIG. 3 is a close up view of the area being welded by a dual focus welder designating significant dimensions.

FIG. 3 shows a close up view of the two key holes designated 22A and 22B. Each key hole has the center designated and there is a dashed line designated S between the two holes. In order to designate the separation and orientation of the two holes, this line S can be termed, "an imaginary line connecting the centers of the two holes." Seam 13 in FIG. 3 is parallel to the translation direction which is designated as arrow 19 in FIG. 2. Therefore, the angle $\theta$ shown between S and 13, also represents the angle between S and translation direction 19 in FIG. 2. FIG. 3 also designates the dimension D1 which is shown as the diameter of hole 22A. However, if hole 22A is not perfectly round, then dimension D1 can be considered the dimension of hole 22A in the direction parallel to imaginary line S. Similarly, hole 22B, has a dimension D2 in this orientation. In the preferred embodiment, angle $\theta$ is close to 90°. However, to receive the benefit of the dual focus, it is merely necessary that the trailing spot does not follow in the tracks of the leading spot to within a distance given by the following formula: $S \sin \theta > \frac{1}{4}(D1 + D2)$. In words, this condition requires that the trailing hole is displaced away from the path of the leading hole by an amount greater than the average radius dimension. This assures that some of the molten metal will flow between the two holes and merge while still in the molten state. This creates the desired benefits of dual focus welding. This means that the two spots cannot be separated by too great a distance.

Another condition to receive the full benefit of the two foci is that the two key holes are distinct and do not merge. The formula which states this condition is as follows: $S > \frac{1}{2} (D1 + D2)$. Finally, if the two spots are separated by too great a distance, the molten metal generated from each spot will not merge. In FIG. 2, 18 represents the molten metal. It can be seen that the molten metal has merged and formed a single pool. While this condition is not specifically related to hole diameter, it is reasonable that the following formula will usually designate a maximum separation between the two holes to achieve the desired interaction: $S < 5 (D1 + D2)$. The optimum dimensions for D1, D2, and S depends on many factors such as the thickness of the metal and the power of the laser. The optimum dimensions are best determined experimentally.

Welding with a dual focus has many advantages over the prior art single focus. Even if the same laser power is split between the two foci, there are many benefits to be realized compared to a single focus weld. These are:

1. In butt welding, a single focus must strike the seam between the two pieces of metal. From the stand point of controllably transferring energy from the laser beam to the metal, this is the worst possible place to strike the metal. The absorption of the laser beam by the metal varies when there is a slight gap left between the two pieces of metal. Also, these gaps can be thought of as causing a variation in the density of the metal. These variations in absorption and density contribute to the problems with butt welding using a laser. The dual beam laser welding avoids having the laser beam strike the seam. Instead, key holes are formed on either side of the seam. The key holes are formed in metal which exhibits a uniform density and absorption. This contributes to increased repeatability and less criticality in positioning of the laser beam relative to the seam.

2. In prior art, single focus welding of a butt joint, the key hole moving along the seam pushes molten metal away from the seam area at the leading edge of the key hole. The molten metal regions ahead of the key hole and along side of the key hole are regions of high pressure. The area behind the key hole is at a low pressure relative to the other regions. The critical step of the metal flowing together in the wake of the passage of the key hole is accomplished in a region of relatively low pressure. This can result in imperfect closure (a poor weld).

In the dual focus weld, the two key holes force the molten metal together in the region between the two key holes. This is to say that the two key holes forms a region of high pressure located between and slightly ahead of the holes. This drives the molten metal together to close the gap.

3. In laser welding, it is necessary to melt a certain volume of material (certain weld width) in order to provide sufficient molten metal so that reliable welds can be made in spite of minor gaps. This principal applies both to lap welds and butt welds. With a single focus spot welder, it is necessary to enlarge the diameter of the spot in order to accomplish a particular weld width at a particular weld speed. This larger spot creates a large key hole. There is only a certain velocity which key holes can be translated through the metal without creating waves and voids in the wake area (weld area). This is a fluid flow limitation which is not helped by adding more laser power. Larger key holes necessitate slower translation velocities to avoid this problem. Two smaller key holes can theoretically be moved at a faster velocity through the metal than one larger key hole. This is to say that if sufficient laser power is available, it should be possible to achieve higher speed welds of a given weld width using two smaller focal spots positioned with a predetermined separation compared to one larger focal spot to accomplish the same weld width. Therefore, even lap welds can benefit from dual focus welding. Heat transfer through metals proceeds at a rate which is inversely proportional to the square of the heat transfer distance. Therefore, a wide melt zone can be made more quickly by two key holes separated transversely compared to one central source of heat (key hole) which must conduct the heat over a greater distance.

Thus far, there has been no discussion as to the method of achieving the two focal spots. There are many possible ways of achieving this affect well know to those skilled in the art. In general, the objective is to create two laser beams which are propagating at a slight angle relative to each other. These two beams can either be adjacent to each other or overlapping. Optical element 20 in FIG. 1 accomplishes the task of forming two beams. The focusing means 14, then forms two foci from the two propagation directions.

In general, the approach which forms two adjacent beams starts off with a laser beam which is usually round or perhaps square. The beam is then in some way bisected such that one half of the beam (for example, the left half) goes at one angle (and ultimately to one focal spot) while the other half (for example, the right half) goes at another angle to the other focal spot. Perhaps the simplest example of this would be if optical element 20 in FIG. 1 was a split mirror with each half oriented at slightly different angles. It is true that splitting the mirror in half introduces some diffraction thereby elongating the focal spot in one dimension. However, the proper tip of the angle of the mirror (one half relative to the other) can orient the elongated dimension of the focal spot parallel to the direction of travel. Therefore, the width of the focal spot is not affected by this approach. More details as to ways of achieving a dual focus are contained in U.S. Pat. No. 4,469,931, entitled, "Laser Assisted Saw Device" by the author herein.

Another approach is where lens 14 also performs the function of optical element 20. This occurs if lens 14 in FIG. 1, was to be split down the middle and the two halves of the lens slightly displaced from each other. This would cause two focal spots to form with a separation distance equal to the separation between the two halves of the lenses. If the separation were along the seam dividing the two halves, then there would be no significant gap left in the lens. While this particular example would perhaps have problems with high power laser beams, this is used as an example to illustrate the general category of approaches which can be taken.

Examples of techniques for producing the dual focus spots where optical element 20 in FIG. 20 forms two overlapping beams include having 20 be a special coarse diffraction grating designed to put most of the power in two lobes. Also, the field of "binary optics" could produce mirrors which resulted in two overlapping beams being produced which, in turn, would form two focal spots. Both of these techniques are known to those skilled in the art. Optical element 20 in FIG. 1 could also be considered any optical means for producing two optical beams propagating at slightly different directions. Optical element 20 plus focusing element 21 together are an example of an optical means for forming two focus spots (first and second focus spots) rotating optical element 20 around an axis (#21 in FIG. 1) perpendicular to the surface of the optical element 20 would rotate the relative position of the two focal spots. This is a means for orienting the first and second focus spots relative to the propagation direction or weld.

Another possibility is to generate two laser beams from two different lasers. These beams could overlap at lens 14. While this would generate two focus spots, they would require the addition of a beam rotating device to permit the two focal spots to be properly oriented. This function of optical element 20 would be carried out by two lasers (properly oriented) and a device such as a "Dove Prism" which can rotate a beam thereby rotating the relative positions of the two focal spots. There are also three mirror optical devices known to those skilled in the art which are the equivalent of a Dove Prism without depending on refraction. It is to be understood that there are many other ways of forming the two focal spots or orienting the two spots known to those skilled in the art. The exact method used is not critical to this invention.

In the preferred embodiment, the two focal spots would be oriented so that the imaginary line S in FIG. 3 is kept generally perpendicular to the translation direction. To accomplish this, the translation direction must be known and there must be a means for adjusting the relative position of the dual focus spots. In this example, rotating optical element 20 can orient the dual focus spots. Other orientation methods are known to those skilled in the art.

Also, it should be understood that the laser beam can either be continuous or repetitively pulsed. Finally, it should be understood that more than two focal spots can be used and fall within the teaching of this patent any time two adjacent spots satisfy the conditions described herein for position and orientation of the dual focus case to create a merging of the molten metal wake.

While there have been shown and described preferred embodiments, it is to be understood that various other adaptations and modifications may be made within the spirit and scope of the invention.

I claim:

1. An improved method of welding first and second pieces of material with laser light the steps comprising:
    position said two pieces of material to form a region of close proximity
    provide a means whereby said laser light forms first and second focus spots
    position said first and second focus spots such that they are separated by a distance "S" which is the length of an imaginary line drawn between a point at the center of said first focus spot and a point at the center of said second focus spot
    position said first and second focus spots so that they strike said first and second pieces of material at least near said region of close proximity
    provide suffcient power in said laser beam such that said first focus spot forms a first hole of diameter "D1" in at least one of said first and second pieces of material, and said second focus spot forms a hole of diameter "D2" in at least one of said first and second pieces of material
    position said first and second focus spots such that said distance "S" satisfies the following conditions: $S > \frac{1}{2}(D1+D2)$ and $S < 5(D1+D2)$
    translate said first and second focus spots relative to said work piece such that said first and second holes move through said work piece in a predetermined translation direction
    orient said first and second focus spots such that said imaginary line makes an angle $\theta$ relative to said translation direction such that the following formula is true: $S \sin \theta > \frac{1}{2}(D1+D2)$.

2. The method according to claim 1 wherein the step of positioning said first and second pieces of material in close proximity includes butting said first and second pieces of material together edge to edge and said step of positioning said first and second focal spots includes positioning said first focal spot such that it primarily strikes said first piece of material and positioning said second focal spot such that it primarily strikes said second piece of material.

3. The method according to claim 1 wherein the step of positioning said first and second pieces of material includes lapping said first piece of material on said second piece of material to form said region of close proximity. Furthermore, the step of positioning said first and second focus spots to strike at least near said region of close proximity includes having said first and second focus spots strike said first piece of material over said region of close proximity. Furthermore, said step of providing sufficient power in said laser light includes having sufficient power such that said first and second holes penetrate through said first piece of material to at least reach said second piece of material.

* * * * *